May 13, 1930.  F. B. WHEAT  1,758,489
PORTABLE PARTITION
Filed Dec. 10, 1928  2 Sheets-Sheet 1
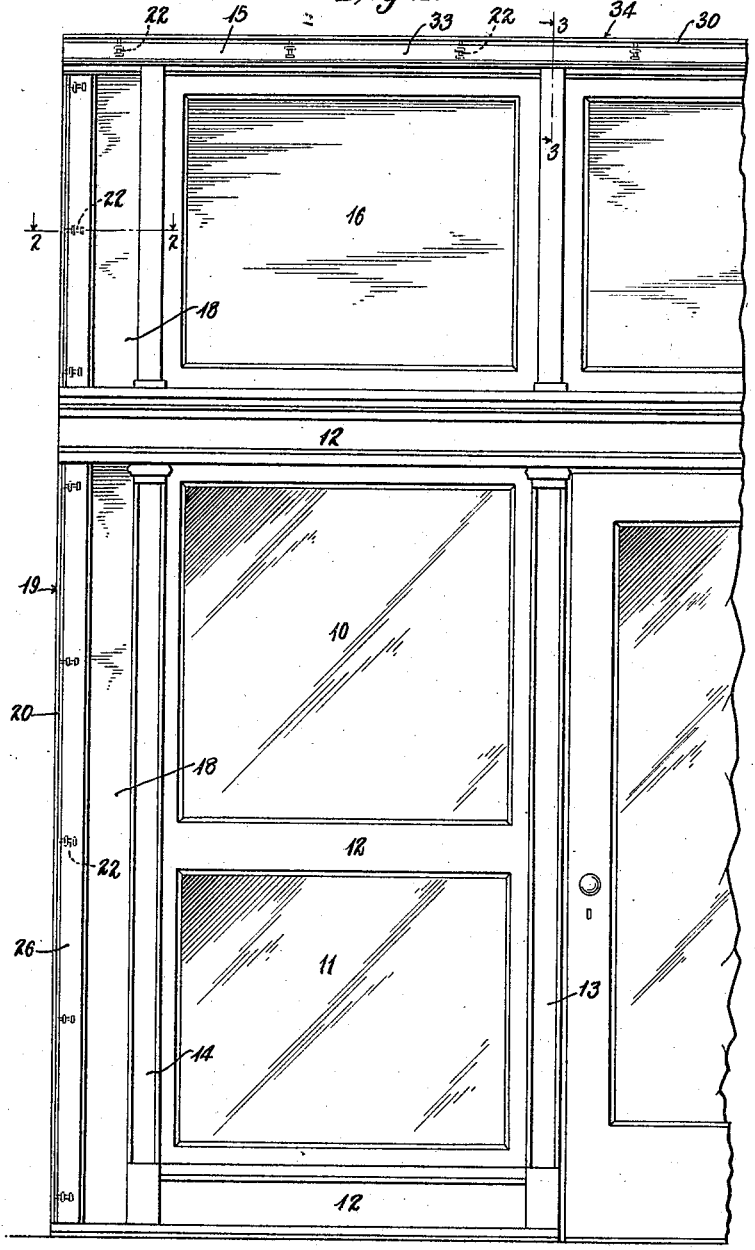

May 13, 1930. F. B. WHEAT 1,758,489
PORTABLE PARTITION
Filed Dec. 10, 1928 2 Sheets-Sheet 2
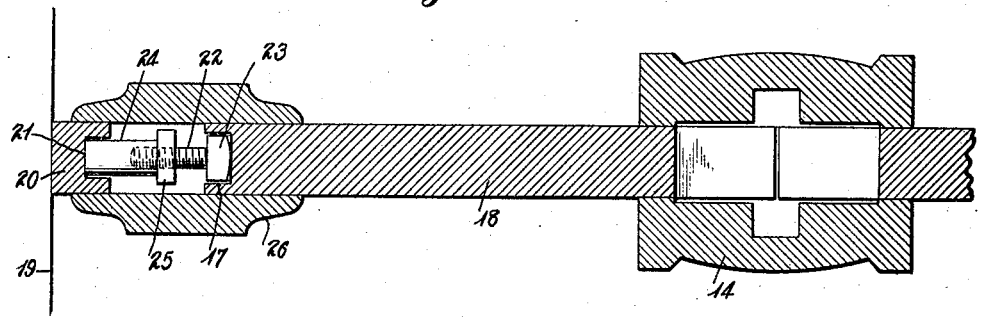
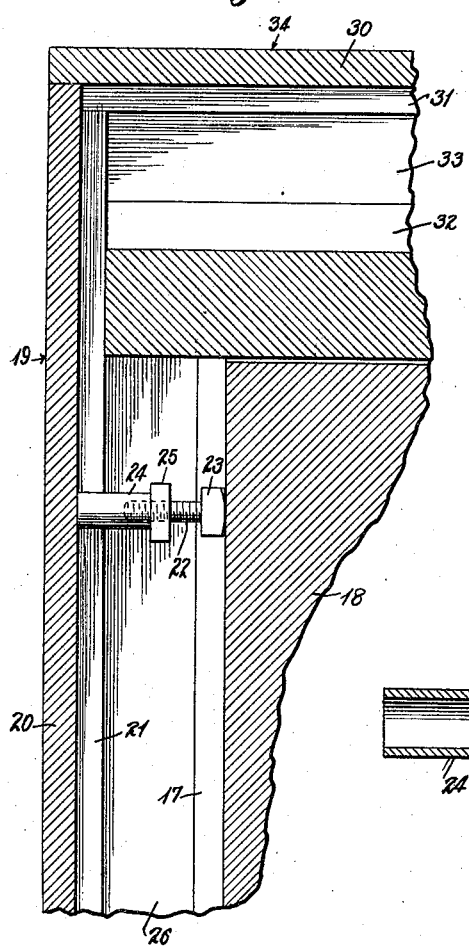
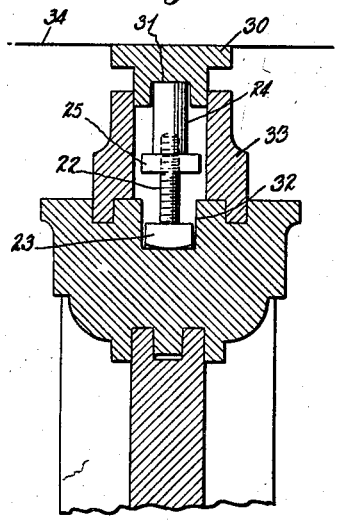
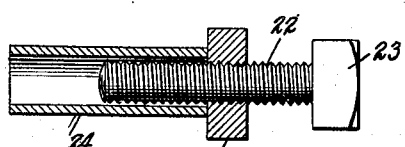
Inventor
Frank B. Wheat
By
his Attorney Patented May 13, 1930

1,758,489

UNITED STATES PATENT OFFICE

FRANK B. WHEAT, OF LOS ANGELES, CALIFORNIA

PORTABLE PARTITION

Application filed December 10, 1928. Serial No. 324,960.

This invention relates to improvements in portable or sectional partitions and particularly to devices for rigidly securing such partitions against the walls, ceiling or other surfaces in the room in which they are erected.

Primarily the invention contemplates a novel arrangement for securely clamping or wedging the partition against the ceiling and walls or the like without liability of damaging or marring the appearance of the plaster. More specifically, the object is to provide a wedge member so associated with portions of the partition that one or more of said members may be installed or used at any number of desired points for the purpose of overcoming or compensating for any unevenness that may occur in the plaster surfaces against which the partition is to be erected.

With these and other objects in view the invention consists in certain novel details of construction and combinations and arrangements of parts, all as will hereinafter be more fully described and the novel features thereof particularly pointed out in the appended claims.

In the accompanying drawings:

Figure 1 is an elevational view of a portion of a partition;

Fig. 2 is a sectional view on the line 2—2 of Fig. 1;

Fig. 3 is a similar view on the line 3—3 of Fig. 1;

Fig. 4 is a detail view of the wedge member;

Fig. 5 is a sectional view on the line 5—5 of Fig. 1.

The partition, proper, which is of the portable type, may be of any desired design, being illustrated in the present instance as comprising upper glass panels 10 and lower opaque panels 11 secured between rails 12 and pilasters 13, 14. Between the molding or mold member 35 on upper rail 12 and the top sash 15 of the partition there are panels 16.

For rigidly securing the partition in place in the room, the pilaster 14 is provided with a longitudinally extending groove 17 preferably formed in a strip 18 secured to said pilaster and interposed between said strip and the wall surface 19 is a second strip 20 which has a similar groove 21 opposed to the groove 17. Engaging in said opposed grooves are the wedging members for securing the partition in place. These wedging members consist of a threaded bolt 22 having a head 23 angular in cross-section seated in one of said grooves, preferably in strip 18, and a sleeve 24 telescoping said bolt and engaging in groove 26. Means are provided for moving the sleeve 24 longitudinally of the bolt, as by having it threaded thereon, but preferably said sleeve is formed with a smooth interior and seats against a nut 25 threaded on said bolt. The walls of groove 17 hold bolt 22 against rotation and as will be apparent, by adjusting the nut on the bolt, said sleeve can be forced against strip 20 and the latter wedged against the wall surface. The nut is spaced from both of the strips 18, 20 so that it may be readily manipulated and after the wedge has been adjusted, the space between said strips is closed by finishing or scribing strips 26. By having the heads of the bolt and the sleeve seating in the continuous grooves any desired number of wedge members may be used at any point desired or necessary to clamp the partition in place and force strip 20 close against the wall surface regardless of any unevenness therein. By using the continuous groove for said wedge members the partition is completed by the manufacturer and nothing has to be done when it is installed in order to utilize the wedges at points where there are inequalities in the wall surface.

For securing the partition at the top, a strip 30 having a groove 31 therein abuts against the ceiling 34 and an opposed groove 32 is provided in the top sash 15. The bolts 22 with the nuts 25 and sleeves 24 assembled thereon are placed in these opposed grooves in the same manner as just described in connection with the side wall. The space between said sash and strip 30 is closed by finishing or scribing strips 33 after the wedges have been adjusted. By the use of strips 20, 30 along the wall and ceiling the finish of the plaster is not marred in any way while, at the same time, any inequalities in those surfaces may be readily compensated for without altering the various elements of the partition in any way whatever.

What I claim is:

1. In a portable partition embodying a pilaster or top sash having a groove extending along the edge thereof, a strip abutting the surface of the wall or ceiling of the room in which the partition is erected, said strip having a groove therein opposed to the groove in the pilaster or sash, a bolt having the head thereof seated in one of said grooves, the side walls of which prevent rotation of said bolt, a sleeve loose on said bolt engaging in the other groove, and means for moving said sleeve longitudinally of said bolt.

2. In a portable partition embodying the pilaster or top sash having a groove extending along the edge thereof, a strip abutting the surface of the wall or ceiling of the room in which the partition is erected, said strip having a groove therein opposed to the groove in the pilaster or sash, a bolt having the head thereof seated in one of said grooves, the side walls of which prevent rotation of said bolt, a sleeve loose on said bolt and engaging in the other groove, and a nut threaded on said bolt engaging said sleeve whereby movement of the sleeve longitudinally of the bolt may be effected by rotation of said nut on the bolt.

FRANK B. WHEAT.